(12) United States Patent
Singer et al.

(10) Patent No.: US 8,682,587 B2
(45) Date of Patent: Mar. 25, 2014

(54) METHOD AND APPARATUS FOR DETERMINING THE PERMEABILITY OF EARTH FORMATIONS

(75) Inventors: Julian Singer, Richmond (GB); Jonathan Howard Saunders, London (GB); Christopher Pain, Berkshire (GB)

(73) Assignee: Sondex Wireline Limited, Bramshill, Hook (GB)

( * ) Notice: Subject to any disclaimer, the term of this patent is extended or adjusted under 35 U.S.C. 154(b) by 1253 days.

(21) Appl. No.: 11/793,587

(22) PCT Filed: Dec. 21, 2005

(86) PCT No.: PCT/GB2005/004974
§ 371 (c)(1),
(2), (4) Date: Apr. 25, 2008

(87) PCT Pub. No.: WO2006/067441
PCT Pub. Date: Jun. 29, 2006

(65) Prior Publication Data
US 2008/0306692 A1 Dec. 11, 2008

(30) Foreign Application Priority Data
Dec. 21, 2004 (GB) .................................. 0427958.4

(51) Int. Cl.
*G01V 1/40* (2006.01)
*G01V 3/18* (2006.01)
*G01V 3/00* (2006.01)
*G01V 9/00* (2006.01)
*E21B 47/00* (2012.01)

(52) U.S. Cl.
USPC ................. 702/11; 702/6; 324/351; 181/102; 166/250.02

(58) Field of Classification Search
USPC ............... 702/1, 2, 6, 7, 9, 11, 33, 39, 54, 75, 702/117, 167, 168, 179, 189; 324/326–339, 324/347, 351, 355; 181/101, 102, 105, 108, 181/111, 112; 340/853.1, 854.5, 855.6, 340/856.3, 856.4; 73/645, 152.01, 152.02, 73/152.16–152.17; 703/1, 2, 5, 10; 166/254.2, 255.1, 250.1, 250.02, 248
See application file for complete search history.

(56) References Cited

U.S. PATENT DOCUMENTS 4,427,944 A 1/1984 Chandler
4,904,942 A 2/1990 Thompson
(Continued)

FOREIGN PATENT DOCUMENTS

EP 0 043 768 1/1982
GB 750 976 6/1956
(Continued)

OTHER PUBLICATIONS

Great Britain Patent Office Search Report dated Apr. 29, 2005.
(Continued)

*Primary Examiner* — Sujoy Kundu
*Assistant Examiner* — Ricky Ngon
(74) *Attorney, Agent, or Firm* — Global Patent Operation (57) ABSTRACT

A method and apparatus for determining the fluid permeability of an earth formation is described. An instrument comprising an acoustic source and acoustic and electrokinetic sensors is located in a borehole at a site of interest. The acoustic source is fired and the resulting variations in pressure and electric field generated are measured and recorded. The Biot equation, and an equation for the streaming potential coupled to fluid displacement terms, is solved using finite element analysis to give an expected pressure waveform and electrokinetic waveform based on estimated earth formation properties. By comparison of the measured waveforms and those calculated from the equations, the actual permeability of the earth formation can be deduced.

24 Claims, 6 Drawing Sheets

(56) References Cited

U.S. PATENT DOCUMENTS

| | | | |
|---|---|---|---|
| 5,519,332 A | | 5/1996 | Wood et al. |
| 5,689,068 A | | 11/1997 | Locatelli et al. |
| 5,784,333 A | * | 7/1998 | Tang et al. ............... 367/30 |
| 5,841,280 A | | 11/1998 | Yu et al. |
| 5,999,484 A | | 12/1999 | Kimball et al. |
| 6,225,806 B1 | | 5/2001 | Millar et al. |
| 6,476,608 B1 | * | 11/2002 | Dong ........................ 324/323 |
| 2009/0145600 A1 | * | 6/2009 | Wu et al. ............... 166/250.02 |

FOREIGN PATENT DOCUMENTS

| | | |
|---|---|---|
| GB | 2 226 886 A | 7/1990 |
| WO | WO 94/28441 | 12/1994 |
| WO | WO 97/14980 | 4/1997 |
| WO | WO 99/05545 | 2/1999 |
| WO | WO 00/53650 | 9/2000 |
| WO | WO 00/55651 | 9/2000 |

OTHER PUBLICATIONS

International Search Report and Written Opinion dated May 18, 2006.

"Modeling of Streaming Potential Responses Caused by Oil Well Pumping", Wurmstich, et al., Geophysics, vol. 59, No. 1 (Jan. 1994) pp. 46-56.

"Dynamic Permeability and Borehole Stoneley Waves: A Simplified Biot-Rosenbaum Model", Tang, et al., J. Acoust. Soc. Am. 90(3), Sep. 1991.

"Using Borehole Electroseismic Measurements to Detect and Characterize Fractured (Permeable) Zones", Mikhailov, et al., Geophysics, vol. 65, No. 4 (Jul.-Aug. 2000), pp. 1098-1112.

"A Mixed Finite-Element Method for Solving the Poroelastic Biot Equations With Electrokinetic Coupling", Pain, et al., Geophys. J. Int. (2004) 160.

* cited by examiner

METHOD AND APPARATUS FOR DETERMINING THE PERMEABILITY OF EARTH FORMATIONS

This invention relates to a method and apparatus for determining the permeability of earth formations, and in particular to a method and apparatus that can be used in the borehole of an oil, gas or water well.

In the hydrocarbon and water industries, it is desirable to be able to measure the properties of the earth and rock in which an underground borehole is situated. In particular, it is desirable to have a continuous, reliable measurement of fluid permeability throughout the borehole. The fluid permeability indicates the ease or difficulty with which natural resources such as oil, gas or water can be obtained from the well, as well as indicating the most suitable technique by which the extraction of such, resources may be achieved.

A number of techniques for determining the permeability of the earth formation surrounding a borehole are known.

Some of these techniques rely on the seismoelectric effect, which describes how relative motion of the fluid and solid components in an earth formation result in the generation of an electric field known as the streaming potential. Almost all minerals that make up rocks have some surface charge, but this is normally neutralised by ions in the fluid occupying the pores in the rock. However, movement of the fluid through the pores of the rock, such as that caused by seismic shocks or vibrations, causes movement of the charge in the fluid relative to the charge of the rock. As a result, an electrical dipole is formed, which can be detected by the flow of an associated electrical current in sensors arranged nearby. The seismoelectric effect is sometimes referred to in general terms as electrokinetics, and the electric signal produced is often known as an electrokinetic signal or a streaming potential.

Relative movement of the fluid and the earth formation in which it is contained can be induced by an acoustic source disposed in the borehole. The acoustic source is arranged to generate a pressure wave in the fluid of the borehole. The pressure wave generated travels through the fluid, and is partially absorbed at the edge of the borehole into the surrounding rock. Inside the rock, the pressure wave causes the fluid to flow in the rock pores resulting in the movement of charge mentioned above. This kind of acoustic source is often also referred to as a seismic source, as the signal generated does not need to be audible to result in a suitable pressure wave.

Measurement of the electrokinetic signal received from the earth formation can be used to estimate a value for the earth formation's permeability. Alternatively, acoustic receivers, known as geophones or hydrophones may be mounted on the same tool as the acoustic source, to determine the pressure wave reflected back from the earth formation. Information derived from the pressure waves can also be used to estimate the permeability, as will be discussed later. Hydrophones and geophones both detect seismic waves. However, hydrophones sense pressure waves, while geophones detect the displacement of an inertial mass and are therefore arranged to measure velocity.

UK patent application GB 2,226,886, for example describes an electroseismic prospecting apparatus, comprising an acoustic source either located at the surface of the well, or inside a shallow well located at the surface. An electroseismic detector and geophone array located at the surface detect reflected acoustic waves from the source and electromagnetic waves to detect the presence of two immiscible fluids in the earth formation.

U.S. Pat. No. 5,841,280 on the other hand describes a method of estimating the porosity of an earth formation from measurements of acoustic energy traversing the earth formation, and from measurements of seismoelectric voltages generated in the formation in response to the acoustic energy. The acoustic energy is generated by a single acoustic source.

However, despite the above techniques, there is no way of reliably determining the permeability of an earth formation from existing methods or devices. The best that can be achieved is an estimate. As mentioned above, the permeability of an earth formation is an important factor for companies involved in the extraction of natural resources, as it indicates the ease with which the extraction may be expected to be achieved. We have therefore appreciated that there is a need for an improved method of determining the permeability of a downhole earth formation.

SUMMARY OF THE INVENTION

The invention is defined by the independent claims to which reference should now be made. Advantageous features are set forth in the dependent claims.

In general terms, an instrument comprising an acoustic source and acoustic and electrokinetic sensors is located in a borehole at a site of interest. The acoustic source is fired and the resulting variations in pressure and electric field generated are measured and recorded. The Biot equations, and an equation for the streaming potential coupled to fluid displacement terms, are solved using finite element analysis to give an expected pressure waveform and electrokinetic waveform based on estimated earth formation properties. By comparison of the measured waveforms and those calculated from the equations, the actual permeability of the earth formation can be deduced.

BRIEF DESCRIPTION OF THE DRAWINGS

A preferred embodiment of the invention will now be described in more detail by way of example; and with reference to the drawings in which.

DETAILED DESCRIPTION OF A PREFERRED EMBODIMENT

A preferred apparatus for use in the preferred method of the invention will now be described with reference to FIG. 1.

Figure 1:
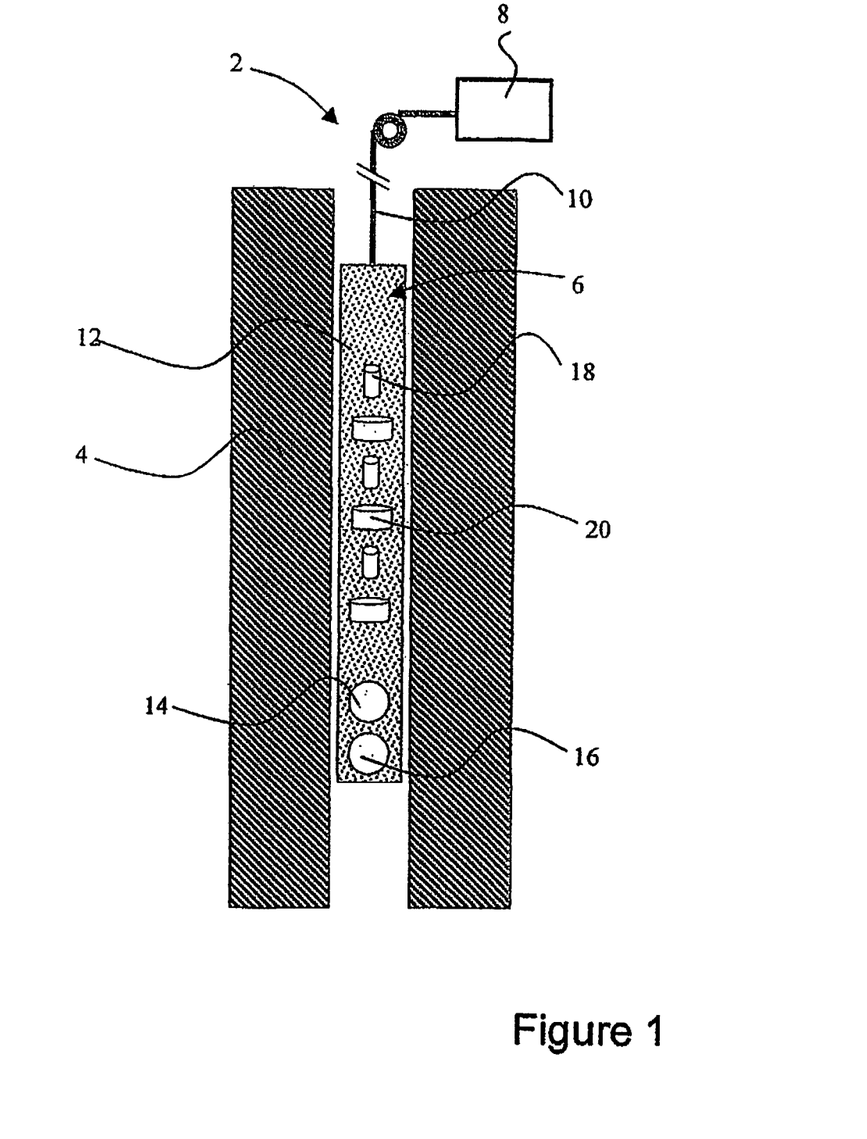
FIG. 1 is a schematic illustration of a downhole apparatus according to the preferred embodiment of the invention.

FIG. 1 schematically shows an apparatus 2 for measuring the acoustic and electrokinetic signals in a borehole 4, and based on the measured signals, determining a value for the permeability of the surrounding earth formation.

The apparatus comprises an instrument 6 for location in the borehole 4, and surface electronics 8, connected together by the electrical connection in a wireline or cable 10. The wireline also allows the instrument to be positioned in the borehole at a location where a measurement of permeability is desired.

The instrument comprises a elongate mandrel 12, on which acoustic sources 14 and 16 are mounted. As is known in the art, these generate acoustic signals that travel along the borehole and into the surrounding rock, causing relative displacement of the fluid and solid components in the rock, and resulting in an electrokinetic signal. Mounted coaxially at spaced locations along the mandrel are a number of acoustic receivers or hydrophones 18, and electrokinetic sensors or electrodes 20. It will be appreciated that the acoustic sensors are arranged to detect pressure variations in the borehole, while the electrokinetic sensors are arranged to detect variations in the electric field.

The hydrophones and the electrodes are arranged in a receiver array containing typically eight hydrophones and eight electrodes equally spaced with a separation of between 5 and 25 cm. In FIG. 1, the acoustic receivers and the electrokinetic receivers are shown as separate elements alternating with each other along the length of the mandrel, and only three of each device are shown for clarity. The array of receivers is typically located about 1 m to 4 m away from the acoustic sources, and may be acoustically isolated from the sources by means of an isolator bar for example.

Although it is possible to determine permeability with just a single electrical and acoustic receiver, an array is preferred as it permits easy identification of wave packets, their velocity and propagation with distance. Also, data from different receiver pairs allows averaging and improvement in signal to noise ratio.

The acoustic signals emitted by the acoustic Sources preferably have frequencies in the range 100 Hz to 20 kHz, and are pulsed so that each pulse consists of a few cycles of signal. The pulses are preferably separated by a few milliseconds, so that at the receivers, the acoustic and electrical signals generated by one pulse will have traveled past the receiver array and can be can be distinguished from the signals generated by the next pulse. This allows the signals received to be easily separated in time.

Preferably, the acoustic sources emit a stream of pulses at different frequencies. This produces two or more sets of acoustic and electrokinetic signals which can be used to compensate for unknown variables of the borehole and surrounding earth formation when determining a value for permeability. These variables comprise at least the mudcake impedence and the zeta potential. This will be described in more detail later.

The signals recorded by the hydrophones and electrodes are transmitted via the cable or wireline to the surface electronics 8 where they can be analysed and stored. The acoustic and electric waveforms detected are recorded for a few milliseconds from the time of an electric trigger generated by firing the source. Based on the recorded acoustic and electric waveforms detected, the permeability can then be deduced using a mathematical model devised by the applicants. The mathematical model allows more accurate readings of permeability to be gained than provided by existing; techniques.

The process of firing the source, and of recording the resulting acoustic and electric waveforms is repeated a number of times for each location of interest in the borehole. The mandrel is then repositioned in the borehole via the cable to take a reading of the permeability at a different location. By repeating the procedure, a log of the permeability along the borehole length can be generated.

In the diagram two acoustic sources are shown for clarity, and each may therefore produce one frequency of acoustic signal. Of course, a single acoustic source or a plurality of such sources may alternatively be used to produce signals of periodically varying frequency, changing in either a step-wise fashion or sweeping continuously through a range of frequencies. Also, although pulsed sources allow the signals generated to be separated easily in the time domain, continuous sources may be preferred in certain circumstances because of the better signal to noise ratio that they offer. For swept or continuous sources, the waveforms are recorded continuously for a certain time and compared with the source driver in a phase sensitive detector or other suitable electronic circuitry. Although hydrophones have been described geophones may also be used.

The mathematical model devised by the applicants will now be described in more detail, in addition to providing a brief discussion of the necessary theoretical background.

As explained above, it is known that there is a direct relation between the electrokinetic field and the pressure differential that creates it. However, with an oscillating source of pressure, such as an acoustic source, the propagation of pressure through the rock becomes complicated. It is best described by the theories of M. A. Biot, which successfully predict the major features of acoustic propagation in rocks such as compressional and shear waves. One particular feature is the presence of a third, so called slow compressional wave in which the fluid and rock frame move out of phase. This relative movement of fluid and rock is the main source of electrokinetic signals.

It will also be appreciated that a borehole, in which the acoustic source may be placed, acts as a waveguide for the acoustic signals generated. The acoustic energy therefore travels within and near the borehole in several distinct wavepackets and modes. For example, the Stoneley wave is one such mode and at frequencies below a few kHz is normally the strongest feature in the waveform. Stoneley Waves move along the borehole relatively slowly, losing energy as they travel mainly by conversion at the borehole wall into slow compressional waves in the rock. Thus, the pressure of the Stoneley wave at any point in the borehole is a good indicator of the strength of the slow wave in the rock. Other wave packets and modes also generate electrokinetic signals in a similar manner.

We have therefore appreciated that the electrokinetic signals detected in the borehole following the firing of the acoustic source should be associated with the wave packet that generated them. Since the acoustic pressure in a wave packet indicates the pressure drop creating the electrokinetic signal, we have found that the ratio of electric to acoustic signal is a close measure of fluid flow in the rock, and hence permeability, this ratio also normalises out many factors that affect the strength of the wave packet, such as the strength of the acoustic source. Thus, by measuring both the electrokinetic waveform and the acoustic waveforms in the borehole, permeability can be deduced with increased accuracy.

The preferred method involves the measurement of both the acoustic wave and the associated electrokinetic wave at respective positions in the borehole following the firing of the acoustic source. The measured values are compared with those output from the model, which predicts the pressure wave and electrokinetic wave, given a number of other variables describing the downhole environment. The model relies on the Biot Equations, developed by M. A Biot.

The Biot equations relates the acoustic propagation in a fluid-filled saturated porous medium with the deformation of the medium itself. They can be expressed as in equations 1 and 2 below in terms of the fluid (acoustic) displacement, $U=(U_r, U_z)^T$, and the solid (elastic) displacement $u=(u_r, u_z)^T$.

This formulation is derived from the stress-strain relationships existing within both the solid and fluid phases in the rock, in addition to the coupling terms through which energy is transferred from one phase to the other. Such coupling occurs in two ways, primarily through a drag term b dependent on the relative motion between the fluid and the solid, and secondarily through apparent mass terms $\rho_{ii}$ which account for the contributions of each phase to the total mass of the moving whole. The treatment is based on assumptions at the macroscopic level, and so a parameterization of the heterogeneities occurring at the pore-scale of the earth formation is required. It is assumed here that wavelengths are long in comparison with the macroscopic elementary volume, that displacements are small, that the fluid phase is continuous and that the solid matrix is both elastic and isotropic. It is also assumed that the saturating phase is a liquid, as a more generalised theory is required where the two phase densities are significantly dissimilar.

$$(\lambda+2\mu)\text{grad div } u + \gamma \text{grad div } U = \rho_{11}\ddot{u} + \rho_{12}\ddot{U} + b(\dot{u}-\dot{U}) + W_{mc}\phi(u-U) \qquad (1)$$

$$\gamma \text{grad div } u + R \text{ grad div } \ddot{U} = \rho_{12}\ddot{u} + \rho_{22}\ddot{U} - b(\dot{u}-\dot{U}) - W_{mc}\phi(u-U) \qquad (2)$$

where:
$\lambda$ is the lame constant of a saturated matrix;
$\mu$ is the shear modulus of a dry porous matrix;
$\gamma$ is a mechanical phase-coupling parameter $= M\phi(\beta-\phi)$ where $$M = \frac{1}{\frac{\phi}{K_f} + \frac{(\beta-\phi)}{K_s}}, \text{ and } \beta = 1 - \frac{K_b}{K_s};$$

$K_s$ is the bulk modulus of the solid;
$K_f$ is the bulk modulus of the fluid;
$K_b$ is the bulk modulus of the dry porous frame;
the effective transmissibility (or hydraulic permeability or fluid mobility)
$R = M\phi^2$;

$b$ is the coefficient governing the wave's energy dissipation $= \frac{\eta \phi^2}{\kappa}$;

$W_{mc}$ is the mudcake impedance (it is the stiffness of a zero thickness mudcake layer along the wall of the borehole, as described by Rosenbaum (1974) and Liu and Johnson (1996));
$\phi$ is the porosity;
$\eta$ is the viscosity;
$\kappa$ is the permeability;
$\rho_{11}$, $\rho_{22}$, and $\rho_{22}$ are apparent mass terms defined as:

$$\rho_{11} = \rho_f + \phi \rho_{fl}(\alpha-2)$$

$$\rho_{12} = \phi \rho_{fl}(1-\alpha)$$

$$\rho_{22} = \alpha \phi \rho_{fl}$$

(for these three terms, the subscript 1 refers to the solid phase, and subscript 2 refers to the fluid phase, thus $\rho_{11}$ denotes the effective mass of the solid phase moving in the fluid; $\rho_{12}$ is a parameter which couples the phases; and $\rho_{22}$ is the effective mass of the fluid moving in the solid);
$\alpha$ is the tortuosity (which through Archie's equation can be related to the porosity as $\phi^{(1-m)}$ where m is the cementation factor);
$\rho_{fl}$ is the density of the pore fluid; and $\rho_f = (1-\phi)\rho_s + \phi \rho_{fl}$, is the saturated bulk density, where $\rho_s$ is the density of the solid.

Furthermore, equations 1) and 2) can be coupled to a simplified form of Maxwell's equations through the solid and fluid displacement terms as follows.

$$\phi(\dot{u} - \dot{U}) = \frac{k}{\eta}[-\nabla p + w^2 \rho_{fl} u + \underline{f}] + L_x E \qquad (3)$$

and $$\underline{j} = L_x[-\nabla p + w^2 \rho_{fl} u + \underline{f}] + \sigma_f E, \qquad (6)$$

where:
E is the electric field;
j is the current density;
u and U are the solid and fluid displacements respectively;
p is the pressure;
w is the acoustic source frequency;
f is an applied body force acting on the fluid phase, eg: a buoyancy force; and
$L_x$ is the electrokinetic coupling coefficient, $$\text{which} = -\frac{\varsigma \varepsilon}{\eta \sigma_{fl}} \sigma_f$$

in water filled rocks, $$\text{or } -\frac{\varsigma \varepsilon}{\eta \sigma_{fl}} \sigma_f Sw$$

in hydrocarbon filled rocks;
where $\sigma_{fl}$ is the conductivity of the pore fluid;
$\sigma_f$ is the saturated rock conductivity;
$\varsigma$ is the zeta potential; which can be described as the electric potential near the mineral/water interface;
$\varepsilon$ is dielectric permittivity; and
Sw is the water saturation.

The coupling term $L_x E$ in equation 3) is small and can be neglected, and in the absence of external current sources, $\Lambda \cdot j = 0$. Thus, $$\nabla \cdot \sigma_f \underline{E} = -\nabla \cdot L_x[-\nabla p + w^2 \rho_{fl} u + \underline{f}] \qquad (5)$$

Substituting the bracketed term in Equation 5 into Equation 3 gives the equation for the streaming potential for low frequency seismic oscillations:

$$\nabla \cdot \sigma_f \nabla \psi = -\nabla \cdot \frac{L_x \eta \phi}{k}(\dot{u} - \dot{U}) \qquad (6)$$

in which $\psi$ is the streaming potential and $\nabla \psi = E$.

The model devised by the applicants is based on the equations given above. It solves Equations 1 and 2 for the time differentials $\dot{u}$ and $\dot{U}$, to give a pressure response p, and Equation 6 for the streaming potential $\psi$ resulting from electrokinesis. It assumes that the various parameters or characteristics of the earth formation, such as porosity, permeability, fluid viscosity, solid and fluid densities and so on, are known. The preferred method of determining permeability uses the model to calculate predicted acoustic and electrokinetic responses based on an estimated value of permeability. The actual acoustic and electrokinetic responses detected in the borehole are then compared with the predicted responses allowing an actual value for the permeability to be derived. Before the preferred method is described however, the way in which the model operates will be described in more detail. For a more detailed discussion, reference should be made to the paper "A mixed finite-element method for solving the poroelastic Biot equations with electrokinetic coupling" by Pain, Saunders, Worthington, Singer; Stuart-Bruges, Mason and Goddard, to be published in the Geophys. J. Int.

The model uses a finite element analysis approach to solve the above equations. This approach is used as it has the geometrical flexibility to allow variable resolution and the ability to represent internal (defined by varying material properties) and external geometries of arbitrary complexity.

A mixed, formulation is used for the spatial discretisation, in order to reduce spurious displacement modes and to eliminate fluid shear waves. The stresses $\sigma$ and strains $\in$ have a finite element representation defined by the M basis functions $Q_h$ that is:

$$\underline{\sigma} = \sum_{j=1}^{M} Q_j \sigma_j \tag{7}$$

$$\underline{\varepsilon} = \sum_{j=1}^{M} Q_j \varepsilon_j \tag{8}$$

The finite element expansion for the displacements is then:

$$U = \sum_{j=1}^{N} N_j U_j \tag{9}$$

$$u = \sum_{j=1}^{N} N_j u_j \tag{10}$$

where N is the number of finite element nodes. The preferred implementation uses four-node rectangular elements with a full bi-linear variation of all velocity components defined by the basis $N_i$ and a constant variation of stresses/strains throughout each element defined by the basis $Q_i$.

Following multiplication of Equations 1 and 2 by the basis functions $N_i$, integration over the domain and incorporation of the above finite element expansions for u and U, the resulting sets of linear equations for the acoustic problem is:

$$A \frac{\partial p}{\partial t} + B \frac{\partial \underline{U}}{\partial t} + L \underline{U} = s \tag{11}$$

$$\frac{\partial \underline{U}}{\partial t} = \underline{p} \tag{12}$$

where $U=(u^T U^T)^T$. A, B and L are matrices containing combinations of the discretised material properties in equations 1) and 2): s and p are vectors containing terms related to the source and pressure respectively.

These equations are solved using preconditioned generalised minimal residual (GMRES) methods, in the time domain, using an implicit unconditionally stable, linear multi-step time-stepping method and iterative solvers. This scheme has a single parameter Θ with values 1, ⅔ or ½ corresponding to Backward. Euler time-stepping, Galerkin linear time elements or second-order Crank-Nicholson time-stepping, respectively.

Using the Galerkin weight residual method and expanding the potential as:

$$\psi = \sum_{i=1}^{N} N_i \psi_i \tag{13}$$

We can also obtain the matrix equation for streaming potential:

$$C \underline{\psi} = \underline{b} \tag{14}$$

The matrix $C_{ij} = -\int_\Omega \nabla N_i \sigma \nabla N_j dV$ is positive-definite, and so this equation is solved using the Preconditioned Conjugate Gradient with a Forward Backward Gauss Seidel preconditioner. This equation has no time terms and requires no time discretisation. It is solved using an updated right hand side into b, which contains the displacement terms u and U, at every time step. The right hand side vector b is given by:

$$b = -\int_\Omega N_i \nabla \cdot \frac{L_x \eta \phi}{k} (\dot{u} \cdot \dot{U}) \cdot dV \tag{15}$$

In the preferred implementation of the finite element model, the total volume examined is a cylinder 12 m high with 2 m radius with the source placed at the centre of the domain. Since symmetry is assumed about the central axis and about the horizontal mid-point, only one quarter of the domain need actually be modelled. Nevertheless, this contains 61118 nodes and 61640 four-node rectangular elements.

Although the model allows virtual receivers to be placed anywhere within the volume, and to record a variety of properties, in the preferred embodiment the receivers are only required to record the pressure and electric potential responses. Thus, the position of the receivers with respect to the source is specified to be at the same position as the receiver array on the apparatus shown in FIG. 1. Additionally, the source used in the model is arranged to describe that of the physical source used in the apparatus of FIG. 1. The source is implemented using a specified boundary condition along the source edge. Features of the source signature including frequency, duration, envelope development and decay, and magnitude are given as input parameters, and are expressed through vector s.

Figure 2:
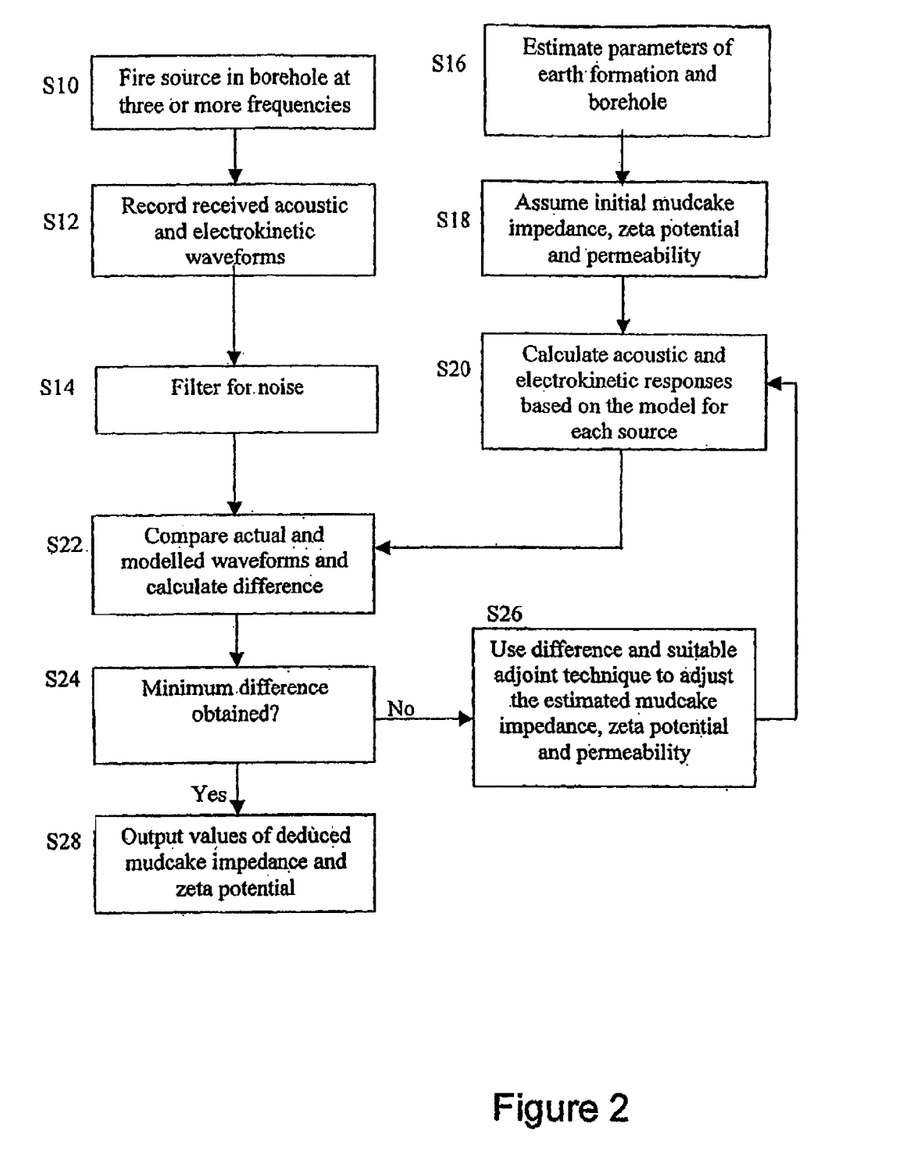
FIG. 2 is a flowchart illustrating a method of determining permeability according to a first preferred method.

Referring to FIG. 2, a first preferred method for determining the permeability of the earth formation will now be described. This method uses an iterative inversion technique based on the forward model described above. This technique adjusts the permeability and other parameters as necessary, in order to minimise the difference between the computed and measured acoustic and electric potential waveforms measured in the borehole. In the first step of the method, the tool apparatus described with reference to FIG. 1 is disposed in the borehole and moved to the position of interest. The acoustic source is then fired in step S10, and the pressures and electrical potentials detected by the array of hydrophones and electrodes are recorded in step S12. The source is fired again two or more times, each time at a different frequency, and the pressures and electrical potentials are recorded each time. Preferred firing frequencies are 0.5 kHz, 1 kHz and 2 kHz, although values in the range 0.1 to 20 kHZ have been found to work well in practice. In step S14 the waveforms produced by the hydrophones and electrodes are filtered to reduce noise.

Next in step S16, the parameters of the earth formation and borehole are estimated, or are measured by other logging tools disposed in the borehole. These parameters include an estimated value of permeability as well as the other properties listed in Equations 1 and 2, and 6. Some parameters may be known from laboratory measurements as constants, such as the elastic modulus of quartz for example. Other rock-fluid and borehole properties may vary significantly as the apparatus is moved along the borehole. It is therefore preferable if the apparatus is used in conjunction with other sensor instruments so that as many as possible local properties of the earth formation can be measured and used as inputs in the data assimilation process. It will be understood that these sensor instruments may comprise part of the same tool string as the permeability detector.

Two properties in particular, the mudcake impedance $W_{mc}$ and the zeta potential $\zeta$, are not well known and are not currently measurable by other logging tools. Mudcake impedance appears in Equations 1 and 2 for the fluid and solid displacements, while $\zeta$, appears in Equation 6 in the term $L_x$. It is therefore necessary to solve for at least the three unknowns of permeability $\kappa$, $W_{mc}$ and $\zeta$ in the iterative inversion process. By running a series of forward models we have found that it can be difficult to separate the effect of these three unknowns at one frequency, but that the effect of each one is different at different frequencies. For this reason it is advantageous to record waveforms at three or more frequencies.

In step S18 initial values for the three unknowns of $\kappa$, $W_{mc}$ and $\zeta$ are assumed. In step S20, the Equations 11, 12 and 14 are solved in the manner described above using the parameters selected in steps S16 and S18. In the calculation, it is assumed that at time T=0 the acoustic source is fired. For each subsequent time value, the acoustic response and the electrokinetic response are derived using Equations 11, 12 and 14, and the techniques mentioned above, for each co-ordinate in the cylindrical system. The typical time step used is one microsecond. The calculation is run in time for several milliseconds until the disturbance has passed outside the modelling domain, or at least past the position in the domain at which the receivers are located. The calculation is repeated for each of the source frequencies that were used in the borehole during the measurement phase.

Control passes from steps S14 and S20 to comparison step S22 in which the measured waveforms and the waveforms calculated by the model are compared and the difference calculated. All measured and calculated waveforms are compared, including waveforms for both potential and pressure, at all frequencies recorded and at the different receiver locations. The differences at each time step between each measured and calculated waveform are summed to give a total difference. The aim of the iterative inversion technique is to minimise the total difference between all calculated and measured values. In step S24, a check is made to see whether the minimum difference has been obtained. If it has not, then in step S26, a suitable adjoint, or local search, technique is used to adjust the values of $W_{mc}$, $\zeta$ and $\kappa$ in the direction that will minimize the difference. Control passes back to step S20 where the acoustic and electrokinetic responses based on the model are calculated for the new values of $W_{mc}$, $\zeta$ and $\kappa$.

Control then passes again to step S22, where the newly calculated waveforms and measured waveforms are compared. In step S24, when the minimum difference is obtained, the permeability, mudcake impedance and zeta potential at which the minimum occurs are assumed to be the correct value and are output in step S28.

In a variation of this technique some parameters of the earth formation other than $W_{mc}$, $\zeta$ and $\kappa$ may not be well known in certain situations. It is then possible to include these other parameters in step S18 and adjust them at the same time as $W_{mc}$, $\zeta$, and $\kappa$, as described above. In another variation, the earth formation may be specified as a set of layers of a given thickness, each with different properties. The inversion then iterates as described above, but varying $W_{mc}$, $\zeta$, and $\kappa$ in each layer until the minimum difference between calculated and measured waveforms is found.

In a second preferred method, the calculation of the values of $W_{mc}$, $\zeta$ and $\kappa$ can be performed by a trained artificial neural network or other pattern recognition technique. The artificial neural network is first trained to predict the model waveforms given the earth formation and borehole parameters, including $W_{mc}$, $\zeta$ and $\kappa$. For this, the forward model is run a large number of times with different input parameters and source frequencies. The waveforms from the forward model are compared with those predicted by the artificial neural network in an inversion procedure until the agreement is considered satisfactory. The network now knows how to convert a given set of material properties into the correct waveforms, and has also calculated the gradient of the function with respect to each parameter. The network is then inverted, or run backwards, with the actual, waveforms recorded in a borehole to give the corresponding input parameters. With the gradients already calculated, the inversion is done rapidly. The known source frequencies, earth formation and borehole parameters are also given to the network so as to constrain the inversion and output the permeability, mudcake impedance, zeta potential and other unknowns that may be specified.

Figure 3:
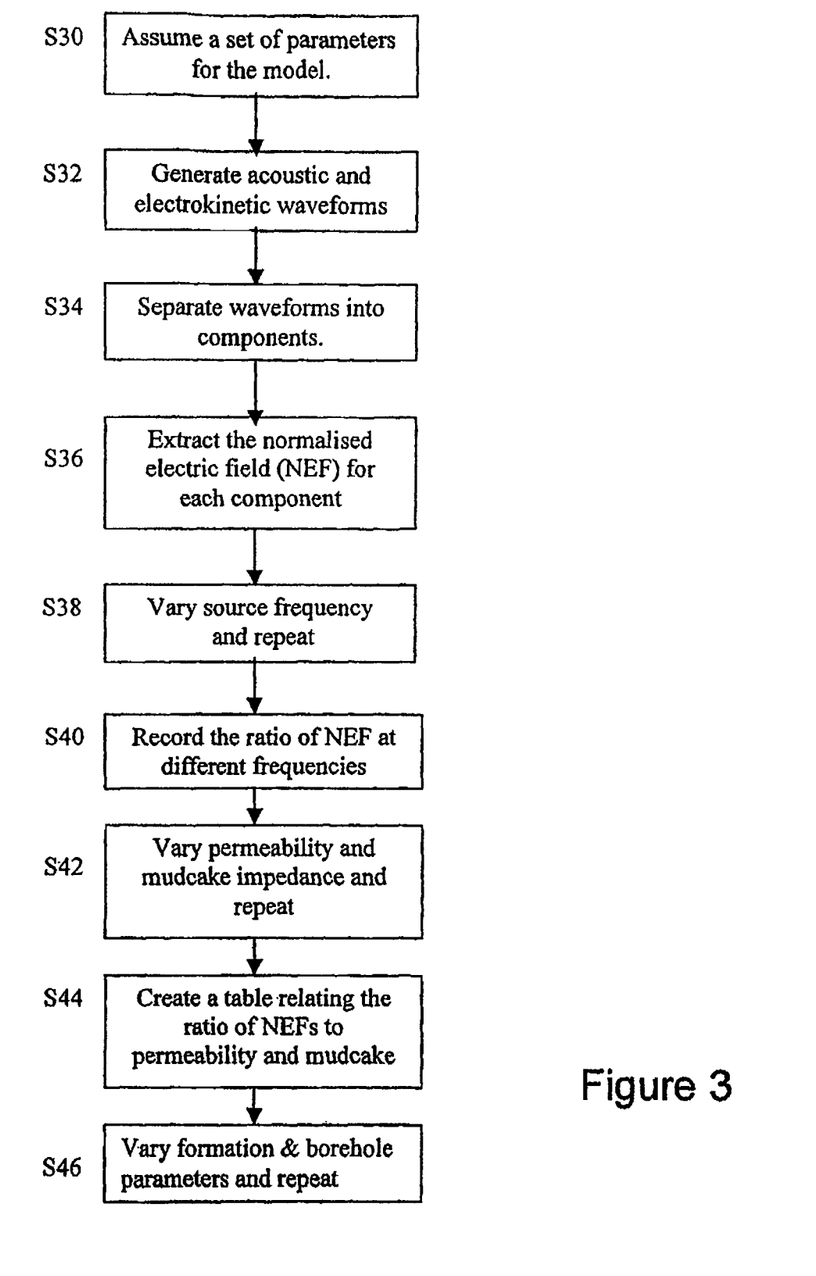
FIGS. 3 and 4 illustrate a third preferred method of determining the permeability of a downhole earth formation.
Figure 4:
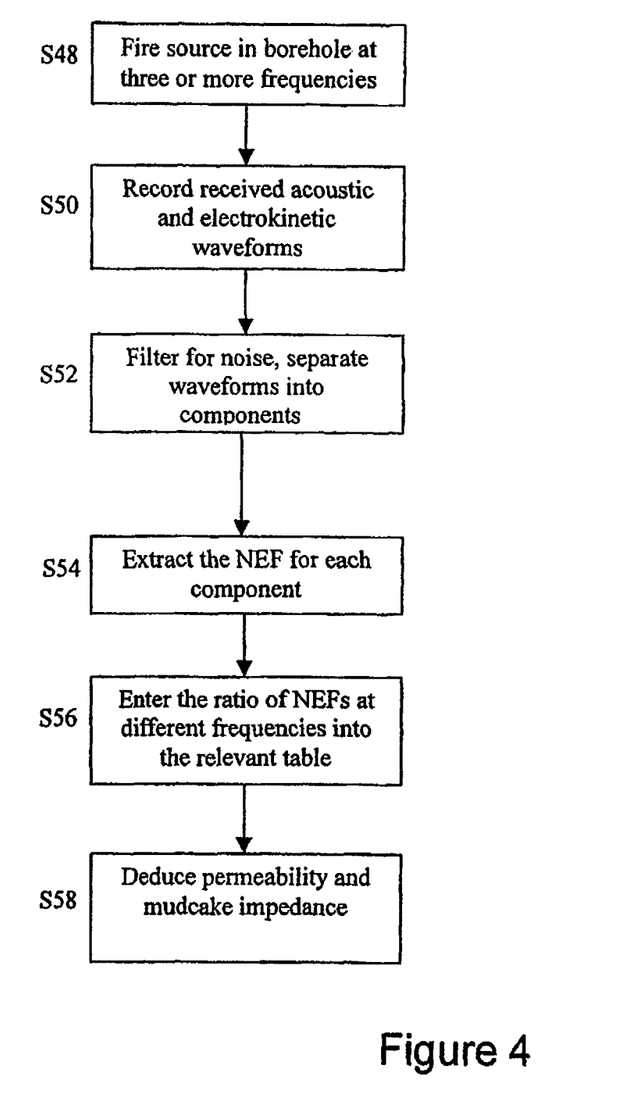

A third preferred method that uses look-up tables will now be described with reference to FIGS. 3 and 4. Firstly in step S30, a set of parameters, describing a model downhole earth formation and borehole is chosen. These parameters include $W_{mc}$, $\zeta$ and $\kappa$ as well as the other properties listed in Equations 3 and 4, and 8. The strength, signature and frequency of the acoustic source are selected to be equivalent to one of those that will be used in the borehole during the measurement phase. Typical frequencies are 0.5 kHz, 1 kHz and 2 kHz. In step S32, the acoustic and electrokinetic waveforms are calculated as in step S20.

In step S34, the model waveforms are processed to separate them into their individual components such as Stoneley waves, shear waves and compressional waves, using a suitable waveform processing technique such as semblance, and filtering. In step S36, the maximum amplitude of the pressure and electrical potential of each waveform component is extracted from the acoustic and electrokinetic waveforms. The ratio of these two values is known as the normalised electric field (NEF) for each component. In most cases it is the NEF associated with the Stoneley Wave that is recorded and used for further processing; but in some cases, such as when the Stoneley Wave is weak, the NEF of another component, or another waveform attribute is used.

Such attributes could be for example the energy, the maximum amplitude, the root mean square amplitude, envelope amplitude, or any of the preceding for a particular component or within a specific frequency range or time interval.

Once the NEF has been calculated for a given set of source parameters, then, in step S38, a new source frequency is chosen and the process repeated. In this way the values of NEF are calculated for a given set of earth formation and borehole parameters at 0.5 kHz, 1 kHz and 2 kHz.

Figure 5:
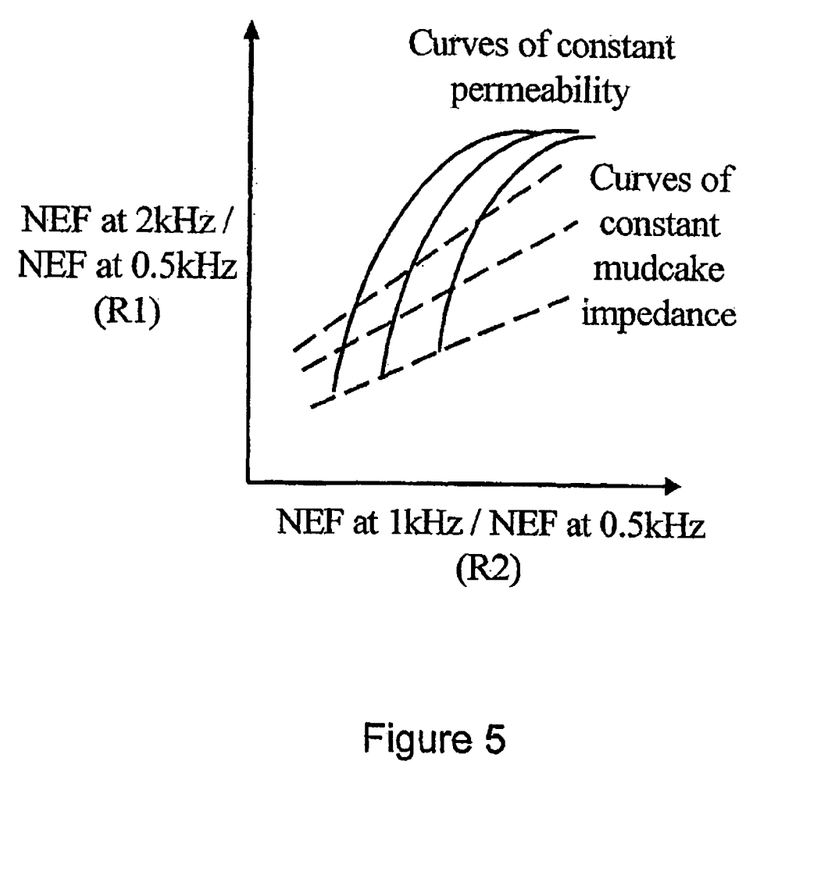
FIG. 5 is a graph schematically showing the ratio of normalised electric fields taken for two different frequency ratios.

In step S40 the value of NEF at 2 kHz is divided by the value at 0.5 kHz to give output R1 and the value at 1 kHz is divided by the value at 0.5 kHz to give output R2. We have found that the effect of the zeta potential $\zeta$ on the NEF does not vary with frequency, providing the frequency is below a few kilohertz. However, the effects of $\kappa$ and $W_{mc}$ do vary with frequency and in different ways. Thus, for a given set of earth formation and borehole parameters, it is possible to compare the NEF at different frequencies, and deduce κ and $W_{mc}$ directly. Referring to FIG. 5, it can be seen that if R1 and R2 are plotted against each other for a range of different κ and $W_{mc}$, the results for constant values of κ lie on one set of lines while results, for constant values of $W_{mc}$ lie on another set of lines. In step S42, κ and $W_{mc}$ are varied and the process of determining the NEFs is repeated. In step 44 the graphical representation of FIG. 5 is implemented in a table with values of R1 on the y-axis and values of R2 on the x-axis. It is then possible to take a particular value for R1 and for R2 and look up, or find, the intersection of these values within the table. This intersection defines a unique value for both κ and $W_{mc}$ as determined by modelling.

In step S46, a new set of possible earth formation and borehole parameters is chosen and the process is repeated. In this way, a series of look-up tables is generated for a number of different cases or scenarios that could be encountered in practice.

In order to determine the permeability of an actual earth formation, the tool apparatus described with reference to FIG. 1 is disposed in the borehole and moved to the position of interest. The acoustic, source is then fired in step S48, and the pressures and electrical potentials detected by the array of hydrophones and electrodes are recorded in step S50. In step S52, the waveforms produced by the hydrophones and electrodes are processed in the same way as described above to separate shear, compressional and Stoneley wave components, and the NEFs are determined in step S54. In step S56, the ratios of the NEF at different frequencies are taken at high and low frequency and at intermediate and low frequency, and entered into the look-up table mat matches the relevant set of earth formation and borehole parameters. As described above; the intersection of the two ratios gives directly the permeability and mudcake impedance. If no table matches exactly the relevant set of parameters, the result is interpolated between the closest tables. Once permeability and mudcake impedance are known, the only remaining unknown is the zeta potential, which can be calculated from any of the NEFs.

In a variation of this technique, other attributes of the waveforms than the NEF may be selected and tabulated in the same way.

Figure 6:
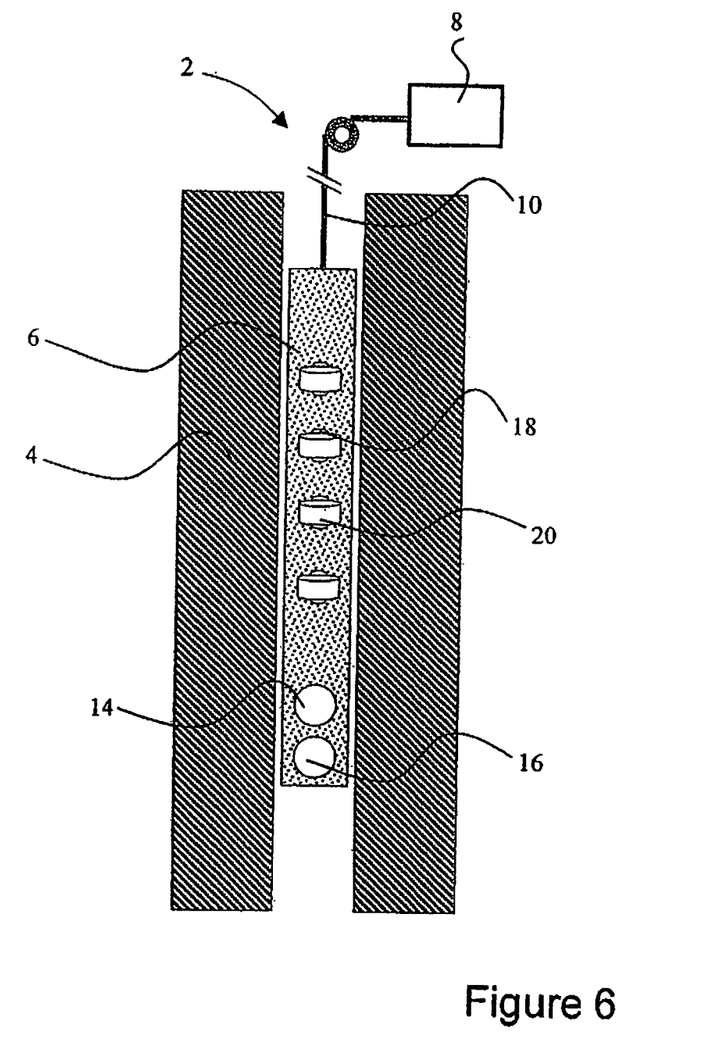
FIG. 6 is a schematic illustration of a downhole apparatus according to an alternative embodiment of the invention.

FIG. 6 shows a second preferred embodiment of the apparatus for determining the permeability of an earth formation surrounding a borehole. The apparatus is substantially identical to that shown in FIG. 1, except that instead of the acoustic receivers and electrokinetic receivers alternating with each other, they are both combined into, a single unit. Four such units are shown in FIG. 6.

This arrangement of receivers may be advantageous as the electrode and hydrophones are co-located at substantially the same position on the mandrel. Thus, any effects on the signal resulting from displacement of the electrical and pressure sensors from each other can be avoided.

Thus, a method has been described in which the permeability of an earth formation can be deduced on the basis of direct measurements of the acoustic and electrokinetic signals in the borehole in response to the firing of an acoustic source. We have appreciated that it is necessary to take readings using acoustic sources of different frequencies, and preferably at three different frequencies, in order to compensate for unknown variables in the downhole environment. Although, only mudcake impedance and zeta potential are specified above, the tortuosity α, for example could also be dealt with in this way. In particular, we have appreciated that mudcake potential and the zeta potential are important variables in determining the permeability and must be properly considered in the calculations. Furthermore, we have appreciated that the permeability can be reliably calculated on the basis of an adapted form of the Biot equation which is then solved by iterative methods. In practice in the past, this has not been appreciated, and values for the permeability have been calculated using simplified analytical solutions. These have often not given accurate results.

Although the methods described here refer to zeta potential, the methods can be used to determine any coupling coefficient, such as the electrokinetic coupling coefficient $L_x$.

The invention claimed is:

1. A method of determining the permeability of a downhole earth formation executed by a computing processor, comprising the steps of:
   generating an acoustic signal at a first point in a borehole;
   detecting, as an acoustic response at a second point in the borehole, variations in pressure resulting from the acoustic signal;
   detecting as an electric response at the second point in the borehole, variations in an electric field resulting from the acoustic signal; and
   determining, using the processor, the permeability of the earth formation using the detected acoustic and electric responses by solving a Biot equation and an expression for a streaming potential given in terms of the fluid and solid displacement to yield an expected pressure waveform and an expected electrokinetic waveform, each based on estimated earth formation properties, and using the processor for comparing the acoustic response and the electric response with each of the expected pressure and electrokinetic waveforms to determine an actual permeability of the downhole earth formation.

2. The method of claim 1, further comprising:
   comparing the predicted acoustic and the predicted electric response with the pressure and the electric response detected in the borehole.

3. The method of claim 1, further comprising generating an acoustic signal at two or more frequencies, such that at least one unknown in the Biot equation, separate to permeability, can be determined or compensated for.

4. The method of claim 3, wherein the at least one unknown includes a mudcake impedance, a zeta potential, or a zeta potential dependent variable.

5. The method of claim 4, further comprising:
   selecting a predicted value of permeability, mudcake impedance and zeta potential or zeta potential dependent variable;
   calculating a predicted pressure and electric response at each frequency, based on the predicted values;
   comparing the predicted pressure and electric responses with those measured in the borehole;
   adjusting the selected values of permeability, mudcake impedance, and zeta potential or zeta potential dependent variable, to minimize the difference between the predicted and measured responses at each frequency.

6. The method of claim 5, wherein minimizing the difference uses the adjoint or local search technique.

7. The method of claim 5, wherein the permeability, mudcake impedance, zeta potential or zeta potential dependent variable are determined using a neural network trained to predict waveforms form parameters of the earth formation.

8. The method of claim 4, further comprising determining a ratio of the electric response to the acoustic response to give a normalized electric field (NEF) value.

9. The method of claim 8, comprising:
i) determining the NEF for at least a first, second and third frequency, assuming that the permeability and at least one unknown variable in the Biot equation is known;
ii) calculating the ratio of the NEF at the first frequency to that at the second frequency, and the ratio of the NEF at the first frequency to that at the third frequency;
iii) repeating steps i) and ii) for different values of and the unknown variable to generate a look-up table;
iv) determining the ratio of the measured electric response to the measured acoustic response at the first, second and third frequency, to give a measured NEF value;
v) determining the value of the permeability and/or the unknown variable based on the measure NEF, and the look-up table.

10. The method of claim 9, wherein the unknown variable is either mudcake impedance, zeta potential or zeta potential dependent variable.

11. The method of claim 9, wherein the first, second and third frequencies are chosen such that the NEF is substantially independent of the zeta potential, or zeta potential dependent variable.

12. The method of claim 9, wherein the Biot equations and the expression for streaming potential are solved using finite element analysis.

13. The method of claim 12, wherein the Biot equation and the expression for streaming potential are solved using a forward model.

14. The method of any of claim 4, wherein the zeta potential dependent variable is the electrokinetic coupling coefficient Lx.

15. The method of claim 3, wherein the acoustic response is processed in dependence on the Stoneley Wave component only.

16. The method of claim 3, wherein an acoustic source is arranged to generate acoustic signals in the range 0.1 to 20 kHz.

17. The method of claim 3, wherein an acoustic source is arranged to generate acoustic signals at 0.5 kHz, 1 kHz, and 2 Hz.

18. An apparatus for determining a permeability of a downhole earth formation, comprising:
an acoustic source for generating an acoustic signal at a first point in a borehole;
an acoustic receiver disposed at a location separated from the acoustic source, the acoustic receiver being arranged to detect, as an acoustic response, variations in pressure resulting from the acoustic signal;
an electrode disposed at a location separated from the acoustic source, the electrode being arranged to detect, as an electric response, variations in the electric field resulting from the acoustic signal; and
processing means for solving a Biot equation and an expression for a streaming potential given in terms of the fluid and solid displacement to yield an expected pressure waveform and an expected electrokinetic waveform based on estimated earth formation properties, and for comparing the acoustic response and the electric response with each of the expected pressure and electrokinetic waveforms to determine an actual permeability of the downhole earth formation.

19. The apparatus of claim 18, wherein the processing means comprises a processor having program code stored thereon, the processor being configured to control the acoustic source, acoustic receiver, and electrode.

20. The apparatus of claim 19, wherein the apparatus comprises a tool body, on which the acoustic source, acoustic receiver and electrode are mounted, the acoustic source being mounted at a separate location from that of the acoustic receiver and electrode.

21. The apparatus of claim 20 wherein the acoustic receiver and electrode are located at substantially the same location.

22. The apparatus of claim 21, comprising at least two acoustic sources.

23. The apparatus of any of claim 21, wherein the acoustic receivers are hydrophones or geophones.

24. An apparatus for determining a permeability of a downhole earth formation, comprising:
at least one acoustic source arranged on a mandrel for generating an acoustic signal at a first point in a borehole;
an acoustic receiver disposed at a location separated from the acoustic source, the acoustic receiver being arranged to detect, as an acoustic response, variations in pressure resulting from the acoustic signal;
an electro-kinetic receiver disposed at a location that is proximate to the acoustic receiver such that the electrokinetic receiver and the acoustic receiver are co-located to form a single sensor unit, the single sensor unit being disposed at a location separated from the acoustic sources, the single sensor unit being arranged to detect, as an electric response, variations in an electric field resulting from the acoustic signal; and
processing means for solving a Biot equation and an expression for a streaming potential given in terms of the fluid and solid displacement to yield an expected pressure waveform and an expected electrokinetic waveform based on estimated earth formation properties, and for comparing the acoustic response and the electric response with each of the expected pressure and electrokinetic waveforms to determine an actual permeability of the downhole earth formation.

* * * * *